Jan. 15, 1952     G. COLUCCI     2,582,620
VARIABLE-SPEED GEARING

Filed Sept. 13, 1948     4 Sheets-Sheet 1

INVENTOR
G. COLUCCI
By Young, Emery & Thompson
Attys.

INVENTOR
G. COLUCCI
By: Young, Emery & Thompson
Attys

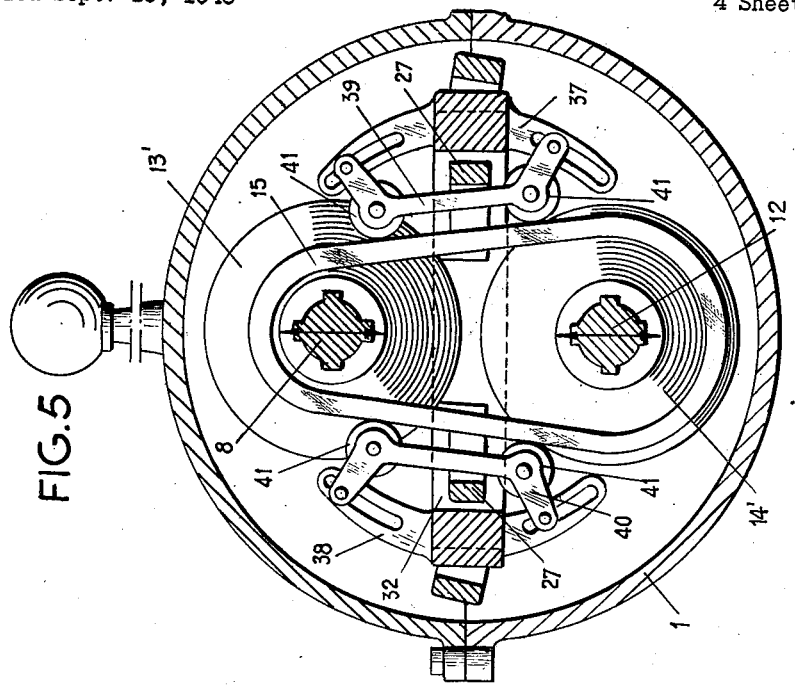
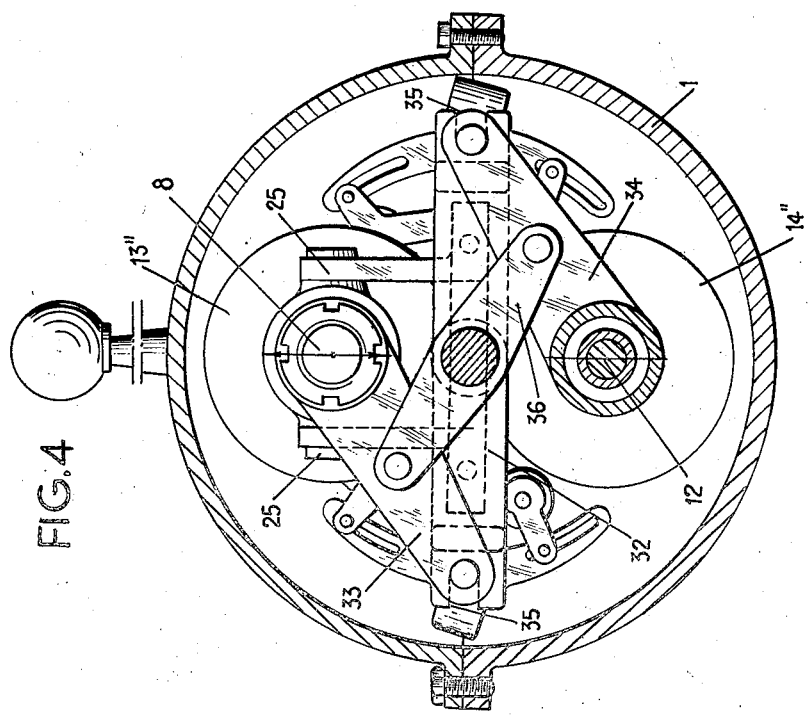

Patented Jan. 15, 1952

2,582,620

UNITED STATES PATENT OFFICE 2,582,620

VARIABLE-SPEED GEARING

Giuseppe Colucci, Naples, Italy

Application September 13, 1948, Serial No. 48,970
In Italy September 15, 1947

9 Claims. (Cl. 74—793)

This invention relates to a variable speed transmission mechanism between a driving and driven shaft, employing one pair of variable diameter pulleys driven by a V-belt or chain, of which the tension is set up and maintained by the centrifugal force generated by the rotation of the pulley system mounted on shafts carried by supports articulated to the axis of rotation of the pulley system.

In my Italian patent application filed on April 17, 1947, I have disclosed a variable friction gearing with contact by points, which is a considerable improvement over known devices of this type.

My new variable speed gearing affords all advantages of the gearing disclosed by said application, is greatly simplified in construction and apt to transmit higher powers, since adherence between the point contact surfaces being replaced by the adherence of a V-belt or chain acting as driving means between pairs of variable diameter pulleys.

My gearing comprises one of a pair of grooved pulleys, each of which is formed by two conical elements facing each other, movable in the direction of the axis of rotation of the pulleys, the displacement of the movable elements of the pair of pulleys being synchronous that is, while the elements of one pulley of the pulley pair move in one direction, the elements of the other pulley move in an opposite direction by the same extent, consequently, as the initial diameter of the groove of one pulley decreases, the initial diameter of the groove of the other pulley increases, and vice versa, whereby a variable ratio transmission between the two pulleys is effected without varying the length of the belt connecting them.

The pulleys are carried by a rotating frame and are connected with the driving and driven shaft, respectively, through a fixed ratio set of gears, which are caused to mesh together by a system of rocking supports which further carry the pulley pivots, whereby a centrifugal force is generated on the pulleys, which tends to draw their axes apart and sets up and maintains the tension on the belt.

The pulley driven by the driving shaft will be referred to hereinafter as "driving pulley" and the one driven by the driving pulley will be referred to as "driven pulley."

Connection between the driving shaft and the shaft carrying the driving pulley may be established by a set of gears as mentioned above, or by other known transmission means, such as a Bowden cable, a system of shafts with Cardan joints, etc. the driving pulley may also be fixedly connected with the big end of a connecting rod and rotating on the crank-pin of a crankshaft of an internal combustion engine, in the latter case, the variable gearing may be incorporated in the engine crank-shaft.

A chain or V-belt composed of elements linked together will be conveniently employed in my variable gearing.

Further features of the variable gearing will appear from the specification in which reference is made to the accompanying drawings, wherein:

Fig. 4 is a section on line IV—IV of Fig. 2;

Fig. 5 is a section on line V—V of Fig. 2;

Fig. 6 shows a detail of the endless V-belt between the grooved pulleys;

Fig. 7 is a cross section on line VII—VII of Fig. 6;

Fig. 8 is a detail view of one of the elements of the chain links; and

Fig. 9 is a section on line IX—IX of Fig. 6.

Figure 1:
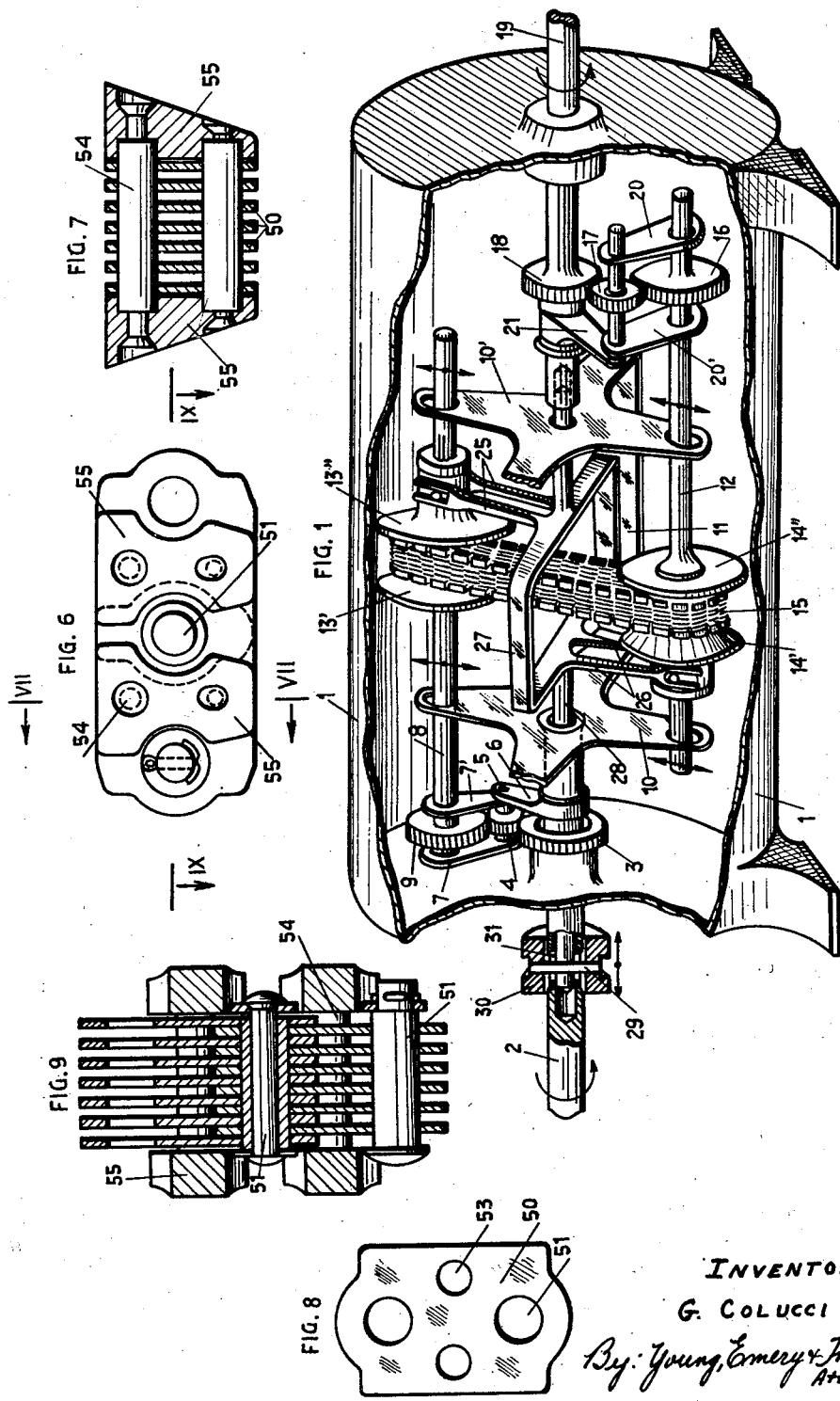
Figure 1 is a diagrammatic perspective view partly in section of the variable speed transmission of the present invention.
Figure 2:
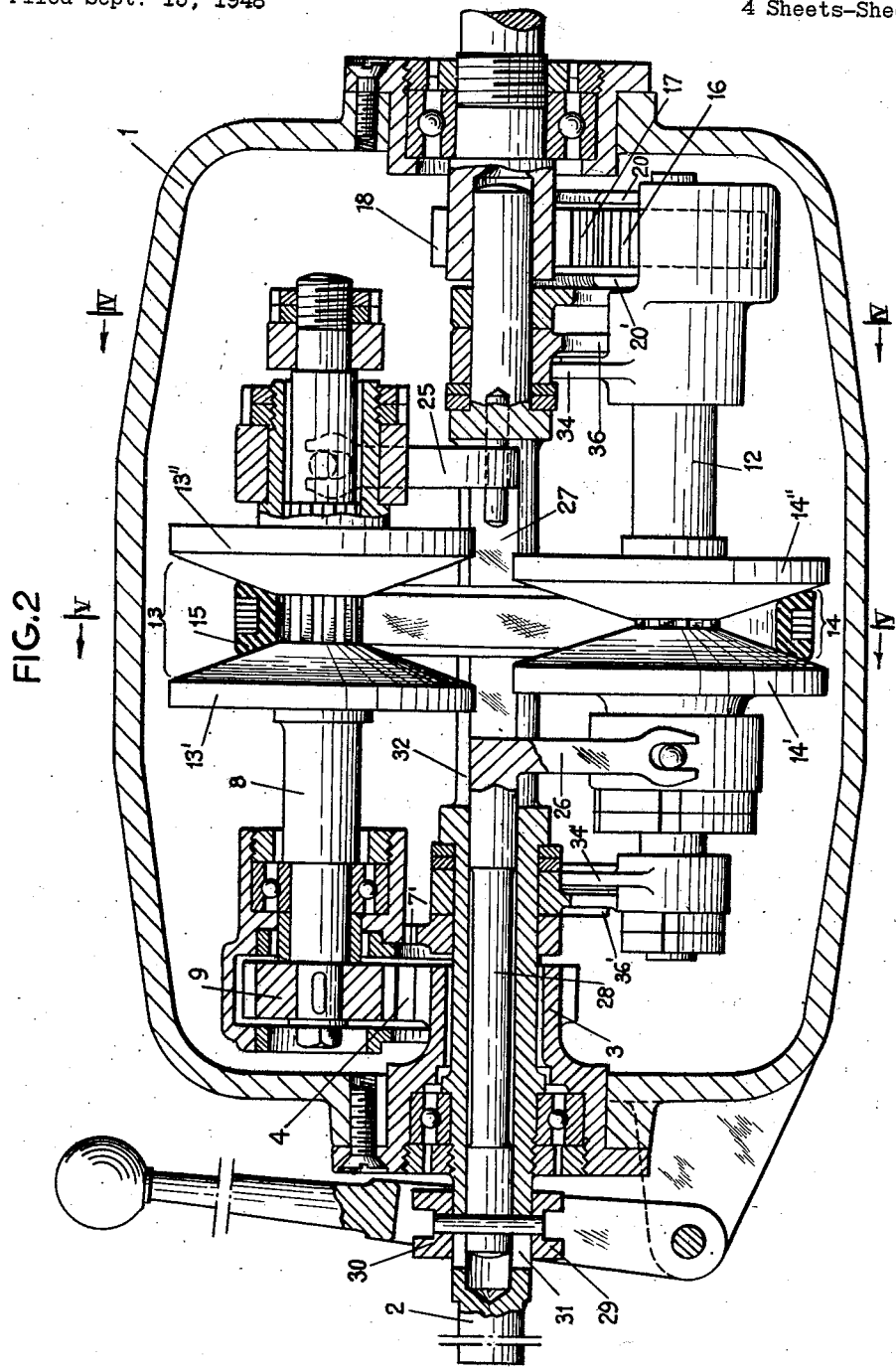
Fig. 2 is a section according to the axial vertical plane of one embodiment.
Figure 3:
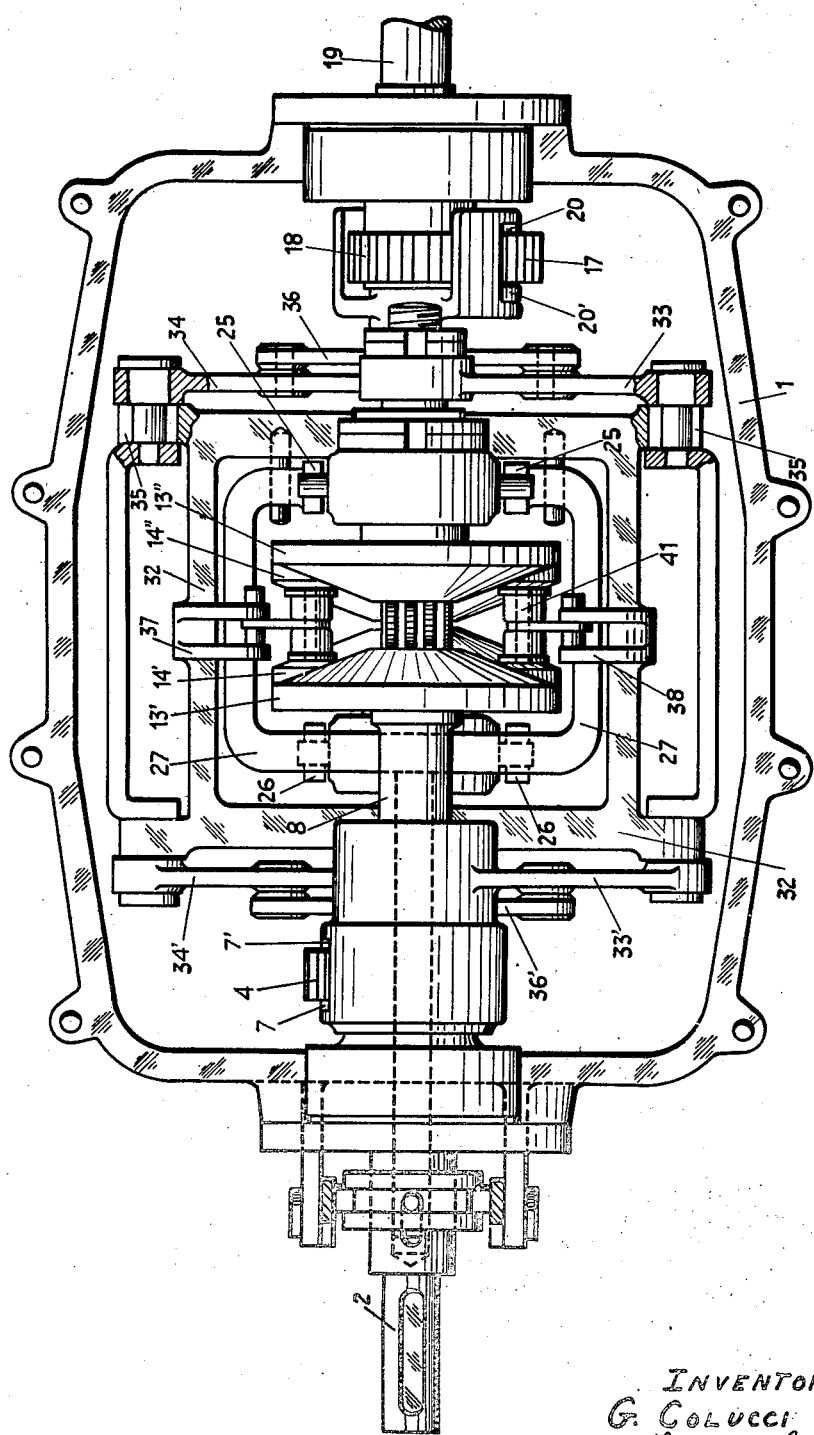
Fig. 3 is a plan view of the variable speed transmission shown in Figure 2, the cover being removed from the casing.

Referring to Fig. 1, I denotes the fixed cylindrical casing enclosing the variable transmission gearing and fitted on one of its bases with the bearings for the driving shaft 2 and driven shaft 19. Said casing I has fixedly attached thereto a spur gear 3 co-axial with the driving shaft, which is constantly in mesh with the toothed wheel 4 loosely carried by the pin 5 supported in turn by the arm 6 loosely rotatable on the shaft 2. The same pivot 5 has mounted thereon, on both sides of the toothed wheel 4, two plates 7, 7' adapted to swing at their other ends about the shaft 8 carrying, between the two plates 7, 7' the toothed wheel 9 constantly in mesh with the loose gear 4. The shaft 8 is supported by two bearings which are free to perform slight displacements in a radial direction with respect to the axis of the casing I, said bearings being carried by a frame composed of two parallel plates 10, 10' connected together by cross members 11, said frame rotating on the central axis of the transmission mechanism and being driven by the driving shaft thereof. The same plates 10, 10' carry at their ends remote from the shaft 8, a pivot 12 which may also be mounted on bearings capable of slight displacements similarly to the pivot 8, or on fixed bearings. It will generally suffice, if one of the pivots 8 or 12 is capable of radial displacement.

The driving and driven pulleys 13, 14 are keyed on the pivots 8, 12 respectively. Each pulley consists of two elements 13'—13", 14'—14", respectively, either of which or both may be axially displaced on their respective pivots 8, 12 by means of a suitable control. In the embodiment shown in Figure 1 the elements 13' and 14" are secured to their shafts, while the other two elements 13" and 14' may be axially displaced by means of two pairs of forks 25 and 26 connected together by a frame 27 controlled by a shaft 28 extending within the driving shaft 2. The shaft 28 is provided at one end with a cross pin 29 secured to an axially slidable control sleeve 30 actuated, for instance, by a fork of the type referred to by 25 and 26. The shaft 2 has bored therein an axially elongated hole 31 to permit displacements of the pin 29 with respect to said shaft.

The pivot 12 has keyed at its end a toothed wheel 16 meshing with the toothed wheel 17 loosely mounted on its pin and meshing in turn with the toothed wheel 18 keyed on the driven shaft 19 supported by the casing 1 and co-axial with the driving shaft 2. The gear 17 is carried with its pin by a linkage consisting of the plates 20, 20' and arm 21 rocking on the shaft 19. The two linkages consisting of the arm 6, gear 5, plates 7, 7' and arm 21, gear 16, plates 20, 20', respectively, are symmetrical and opposed with respect to the axis of rotation of the variable speed gearing, whereby the centrifugal forces generated by the rotation of the systems about said axis, tend to draw apart the pulleys 13 and 14, setting up and maintaining the necessary tension of the belt 15. It will be clearly seen from the figure that said linkages are apt to maintain the toothed wheels 3, 9 and respectively 16, 8 constantly coupled notwithstanding the radial displacements of said shafts 8, 12, respectively.

The toothed wheels 3 and 9 transmitting motion from the driving shaft 2 to the pulley 13 establish a fixed transmission ratio, so that the pulley 13 rotates at constant speed as a function of said ratio.

Similarly, the toothed wheels 16 and 18 transmitting motion from the pulley 14 to the driven shaft 19 may differ in diameter and number of teeth. Consequently, the transmission of motion from the driving shaft 2 to the driven shaft 19 is effected with a ratio depending upon the variable value of the diameters of the pulleys 13 and 14 and the fixed ratio between the diameters or number of teeth of the gears 3, 9 and 16, 18 respectively.

This mechanism is not only a variable speed transmission, but also a reversing gearing. In fact, as the frame 27 rotates, the gear 4 rolls on the stationary gear 3 and sets in rotation the gear 9 keyed on the shaft 8 of the driving pulley 13 at a speed depending upon the transmission ratio between the said gears 3 and 9. By varying the effective diameter of the pulleys 13 and 14, this speed is suitably changed and transmitted through the V-belt to the pulley 14 and to the gear 16 keyed on the shaft 12 of said pulley 14. The gear 16 sets then in rotation the driven shaft 19 through the gears 17 and 18. However, since the loose gear 17 simultaneously performs a rolling movement on the gear 18, the rotational speed of the shaft 19 is the algebraic sum of the rolling speed and of the rotational speed transmitted to said shaft merely by rotation of the gear 16. The two transmission ratios 3, 9 and 16, 18 respectively may be selected at will on construction so that, on variation of the effective diameters of the pulleys 13, 14, the speed of the shaft 19 will vary between predetermined limits. More particularly, the said speed may vary, mathematically speaking, between zero and a right limit, or between zero and a left limit, or else between right and left limit passing through the zero value. In fact, with given pairs of values of the transmission ratios 3, 9 and 16, 18 and a given position of the V-belt on the pulleys 13, 14, the component speeds (rotational and rolling) influencing the shaft 19 may accurately balance each other giving thus a zero resultant. The shaft 19 remains then stationary notwithstanding the rotation of the driving shaft 2. If this singular point is selected for one of the two extreme positions of the V-belt on the pulleys 13, 14, the resulting rotation may vary upwards from zero (direct variable-speed transmission) or downwards from zero only (reverse variable-speed transmission). But if these singular ratios produce a zero resultant speed when the V-belt is in an intermediate position, by varying the effective diameter of the pulleys 13, 14 in either direction, the speed of the shaft 19 shall be variable both in the same direction of rotation as the driving shaft 2 as in a contrary direction.

The above described mechanism is subject on account of its structure to variations in balance as a result of the variation in diameter of the pulleys 13 and 14 which displace the center of gravity of the system. The variable speed gearing is therefore provided with balancing means omitted in Figure 1 for the sake of clearness. Said means will be clearly illustrated and described referring now to the construction shown in Figures 2, 3, 4 and 5.

As mentioned above, the shafts 8 and 12 or, at least one of them are capable of performing limited radial displacements in order to maintain the belt 15 tensioned. Preferably, both shafts 8 and 12 are afforded the possibility of effecting such displacement and to perform them symmetrically, thus the action of balancing means is merely limited to the balancing of belt 15, since the shafts 8 and 12 and their respective pulleys balance each other. In order to insure the symmetry of said displacements, the plates 10 and 10', Figure 1, are substituted in Figures 2 to 5 by a frame 32 fixed to the driving shaft and connected with two identical linkages symmetrical with respect to the longitudinal axis of the variable speed gear.

The frame 32 is arranged perpendicular to the plane of the two shafts 8 and 12 which are loosely mounted each on two stiff rods 33, 33' and 34, 34', respectively, of which the other ends are slidably engaged in guide slots 35 formed in said frame 32. The rigid rods are centrally articulated by pairs by means of two rods 36, 36', respectively, loosely mounted on the shaft 2.

It will be clear that these linkages permit displacement of the shafts 8 and 12 symmetrically with respect to the central axis of the gearing and in the direction indicated by the arrows.

The balancing means consists of two concentric guides 37 and 38, fixed to the frame 32, in which two carriages 39, 40, respectively, are slidably mounted and carry each a pair of loose rollers 41. The latter roll on the external surface of the belt 15 and automatically take a position parallel with the corresponding trait of the belt, eliminating any disturbance of the balance due to the form assumed by said track.

Obviously, the size of said carriages shall be proportioned to the mass of the track, the size of the pulleys and their axle base, which will be easily calculated by any expert.

On account of the possible reduction in size of the variable speed gearing and, consequently, of the small diameters of the grooved pulleys, it is not possible to employ as a drive between the pulleys a conventional V-belt. Consequently a special chain or linked belt must be adopted, such as shown by way of example in Figures 6, 7, 8 and 9.

The chain is made up of contiguous sets of links, each consisting of juxtaposed staggered plates 50, substantially of the shape shown in Figure 8, that is, comprising a rectangular central portion having laterally two sectors in which concentric holes are bored for the link pins 51. The plates 50 are separated by similar plates of the contiguous link (Fig. 9). A number of plates, depending upon the power to be transmitted, and two side tabs 55 form the link core, the plates and tabs being held together by pins 54 extending through suitable holes 53 in the plates, which further keep in position in a convenient spaced relationship the two tabs 55 on which they are riveted. The two tabs impart to the chain section a trapezoidal shape, as shown in Figure 7.

A suitable friction lining is applied to the internal conical surface of the pulley members.

Similar lining material may be applied laterally on the tabs of the chain links, instead of on the cones.

The invention is not confined to the specific embodiment shown and described and is intended to cover such variations thereof as fall within the scope of the appended claims.

What I claim is:

1. In a variable speed gearing, a fixed casing, a driving and driven shaft mounted in alignment on the opposite sides of said casing, a rotatable support fixed to said driving shaft, two secondary shafts parallel with said driving shaft and rotatably mounted on opposite ends of said support, said secondary shafts being free to perform limited radial displacements with respect to the central axis of said gearing, a driving variable diameter pulley operatively mounted on the first secondary shaft, a driven variable diameter pulley operatively mounted on the second secondary shaft, an endless member cooperating with said pulleys, means for driving the first secondary shaft from said driving shaft, means for transmitting the motion from the second secondary shaft to the driven shaft, and means for varying the effective diameters of said pulleys in order to change a speed ratio between said secondary shafts.

2. In a variable speed gearing, a fixed casing, a driving shaft rotatably mounted on one side of said casing, a driven shaft rotatably mounted on the opposite side of said casing in alignment with said driving shaft, a rotatable support fixed to said driving shaft, two secondary shafts parallel with said driving shaft and rotatably mounted on opposite ends of said support, said secondary shafts being free to perform limited radial displacements with respect to the central axis of the gearing, a driving variable diameter pulley operatively mounted on first said secondary shaft, a driven variable diameter pulley operatively mounted on the second secondary shaft, an endless member cooperating with said pulleys, a non-rotatable spur gear coaxial with the driving shaft, constant ratio rotary speed transmitting means cooperating with said spur gear and the first secondary shaft, another constant ratio rotary speed transmitting means cooperating with said second secondary shaft and the driven shaft, and means for varying the effective diameters of said pulleys in order to change the speed ratio between said secondary shafts.

3. Variable speed gearing as claimed in claim 2, in which said first constant ratio rotary speed transmitting means comprise a toothed wheel fixed on one end of the first secondary shaft and an intermediate gear constantly meshing with said wheel and with said non-rotatable spur gear, said intermediate gear being supported by a suitable linkage system rocking about said driving shaft and about said first secondary shaft.

4. Variable speed gearing as claimed in claim 2, in which said second constant ratio rotary speed transmitting means comprise a spur gear keyed on one end of the second secondary shaft, a second spur gear keyed on the driven shaft, and an intermediate gear constantly in mesh with said two spur gears, said intermediate gear being supported by a suitable linkage system rocking about said driven shaft and about said second secondary shaft.

5. Variable speed gearing as claimed in claim 2, in which said rotating support comprises a frame fixed to the driving shaft and two axially spaced linkage systems supporting said secondary shafts in such manner that symmetrical radial displacements of said shafts are obtained.

6. In a variable speed gearing a fixed casing, a driving shaft rotatably mounted on one side of said casing, a driven shaft in alignment with said driving shaft and rotatably mounted on the opposite side of said casing, a non-rotatable spur gear coaxial with and embracing said driving shaft, a rotating support fixed to said driving shaft, a first secondary shaft parallel with said driving and driven shaft and rotatably mounted on one side of said support, a second secondary shaft parallel with said first secondary shaft and rotatably mounted on the opposite side of said support, said secondary shafts being free to perform slight displacements in a radial direction with respect to the axis of said casing, constant ratio rotary speed transmitting means interposed between said non-rotatable spur gear and said first secondary shaft; second constant ratio rotary speed transmitting means interposed between said second secondary shaft and said driven shaft; two variable diameter pulleys supported by said secondary shaft, an articulated V-belt cooperating with said pulleys, said belt consisting of links formed by metal plates connected in spaced relationship for permitting insertion of the plates of one link between the plates of the adjacent links, the plates being articulated together on a common pin connecting contiguous links, and means for varying the effective diameters of said pulleys in order to change the rotary speed ratio between said secondary shafts.

7. Variable speed gearing as claimed in claim 6, wherein the outer plates of each link are provided with side tabs having variable thickness in order to impart a V-section to each link.

8. Variable speed gearing as claimed in claim 6, wherein the outer plates of each link are provided with side tabs having variable thickness in order to impart a V-section to the link, said tabs being faced with suitable friction material.

9. Variable speed gearing as claimed in claim 6, wherein the friction material is applied to the conical surfaces of the pulley elements cooperating with said V-belt.

GIUSEPPE COLUCCI.

REFERENCES CITED

The following references are of record in the file of this patent:

UNITED STATES PATENTS

| Number | Name | Date |
| --- | --- | --- |
| 2,101,845 | Fraser | Dec. 14, 1937 |
| 2,455,407 | Christmann | Dec. 7, 1948 |
| 2,459,969 | Schweickart | Jan. 25, 1949 |